(12) United States Patent
Seok

(10) Patent No.: US 9,712,297 B2
(45) Date of Patent: Jul. 18, 2017

(54) METHOD AND DEVICE FOR TRANSMITTING DATA

(71) Applicant: TECHFLUX, LTD., Seojong-si (KR)

(72) Inventor: Yong H Seok, Irvine, CA (US)

( * ) Notice: Subject to any disclaimer, the term of this patent is extended or adjusted under 35 U.S.C. 154(b) by 0 days.

(21) Appl. No.: 15/390,604

(22) Filed: Dec. 26, 2016

(65) Prior Publication Data

US 2017/0104565 A1    Apr. 13, 2017

Related U.S. Application Data

(63) Continuation of application No. PCT/IB2015/001260, filed on Jun. 26, 2015.

(30) Foreign Application Priority Data

Jun. 27, 2014    (KR) .................. 10-2014-0080171

(51) Int. Cl.
*H04W 4/00* (2009.01)
*H04L 5/00* (2006.01)
*H04L 27/26* (2006.01)
*H04W 28/20* (2009.01)
*H04W 84/12* (2009.01)
*H04B 7/0413* (2017.01)

(52) U.S. Cl.
CPC .......... *H04L 5/0044* (2013.01); *H04L 5/0037* (2013.01); *H04L 5/0092* (2013.01); *H04L 27/2602* (2013.01); *H04L 27/2628* (2013.01); *H04W 28/20* (2013.01); *H04B 7/0413* (2013.01); *H04L 5/0007* (2013.01); *H04W 84/12* (2013.01)

(58) Field of Classification Search
CPC ... H04L 5/0044; H04L 5/003; H04L 27/2602; H04L 27/2628; H04L 5/0007; H04W 28/20; H04W 84/12; H04B 7/0413
See application file for complete search history.

(56) References Cited

U.S. PATENT DOCUMENTS

| | | | |
|---|---|---|---|
| 7,054,296 B1 | 5/2006 | Sorrells et al. | |
| 8,411,632 B2 | 4/2013 | Kneckt et al. | |
| 8,625,562 B2 * | 1/2014 | Noh ..................... | H04W 72/042 370/338 |
| 8,665,795 B2 | 3/2014 | Ketchum et al. | |
| 8,787,341 B2 | 7/2014 | Sohn et al. | |
| 8,824,266 B2 | 9/2014 | Kwon | |
| 8,879,523 B2 | 11/2014 | Fischer et al. | |
| 8,885,495 B1 | 11/2014 | Liu et al. | |
| 8,885,535 B2 | 11/2014 | Fischer et al. | |
| 8,886,755 B1 | 11/2014 | Liu et al. | |
| 8,897,298 B2 | 11/2014 | Wentink | |
| 8,917,705 B2 | 12/2014 | Merlin et al. | |
| 8,923,146 B2 | 12/2014 | Ong et al. | |

(Continued)

FOREIGN PATENT DOCUMENTS

| | | |
|---|---|---|
| CN | 1617693 A | 5/2005 |
| CN | 102412944 A | 4/2012 |

(Continued)

*Primary Examiner* — Abdelnabi O Musa

(57) ABSTRACT

A method for transmitting data in a wireless local area network and a device suing the same are provided. The device transmits a plurality of medium access control protocol data units (MPDUs) to at least one destination station. Duration fields in all of the plurality of MPDUs are set to a same value.

10 Claims, 13 Drawing Sheets

(56) References Cited

U.S. PATENT DOCUMENTS

| | | |
|---|---|---|
| 8,964,618 B2 | 2/2015 | Seok |
| 8,989,102 B2 | 3/2015 | Kenney et al. |
| 9,001,797 B2 | 4/2015 | Wentink |
| 9,014,105 B2 | 4/2015 | Chu et al. |
| 9,439,173 B2 | 9/2016 | Yi et al. |
| 9,510,220 B2 | 11/2016 | Yi et al. |
| 2003/0055881 A1 | 3/2003 | Ngo |
| 2006/0073791 A1 | 4/2006 | Senarath et al. |
| 2008/0019373 A1 | 1/2008 | Filipovich et al. |
| 2008/0274760 A1 | 11/2008 | Senarath et al. |
| 2010/0067363 A1 | 3/2010 | Yu |
| 2010/0111005 A1 | 5/2010 | Ahn et al. |
| 2010/0165829 A1 | 7/2010 | Narasimha et al. |
| 2011/0013575 A1 | 1/2011 | Liao et al. |
| 2011/0013721 A1 | 1/2011 | Liao et al. |
| 2011/0096685 A1 | 4/2011 | Lee et al. |
| 2011/0211462 A1 | 9/2011 | Wu et al. |
| 2012/0177018 A1 | 7/2012 | Abraham et al. |
| 2012/0213308 A1 | 8/2012 | Merlin et al. |
| 2012/0214523 A1 | 8/2012 | Senarath et al. |
| 2012/0243454 A1 | 9/2012 | Hwang et al. |
| 2012/0287771 A1 | 11/2012 | Loghin et al. |
| 2012/0314695 A1* | 12/2012 | Liu .................... H04W 28/065 370/338 |
| 2013/0070670 A1 | 3/2013 | Wentink |
| 2013/0173067 A1 | 7/2013 | Kaneko et al. |
| 2013/0182593 A1 | 7/2013 | Zhang et al. |
| 2013/0182599 A1 | 7/2013 | Bachl et al. |
| 2013/0229996 A1 | 9/2013 | Wang et al. |
| 2013/0242769 A1 | 9/2013 | Hammarwall et al. |
| 2013/0343300 A1 | 12/2013 | Kim et al. |
| 2014/0056192 A1 | 2/2014 | Meylan et al. |
| 2014/0079003 A1* | 3/2014 | Noh ....................... H04L 5/001 370/329 |
| 2014/0192662 A1 | 7/2014 | Chetlur et al. |
| 2014/0307568 A1 | 10/2014 | Zhang et al. |
| 2014/0314048 A1 | 10/2014 | Yi et al. |
| 2014/0341048 A1 | 11/2014 | Sajadieh et al. |
| 2015/0063140 A1 | 3/2015 | Yi et al. |
| 2015/0110046 A1 | 4/2015 | Merlin et al. |
| 2015/0124689 A1 | 5/2015 | Merlin et al. |
| 2015/0124690 A1 | 5/2015 | Merlin et al. |
| 2015/0264713 A1 | 9/2015 | Amemiya |
| 2015/0341130 A1 | 11/2015 | Zhou et al. |
| 2015/0373587 A1* | 12/2015 | Josiam ................ H04W 28/20 370/338 |
| 2016/0014729 A1* | 1/2016 | Wentink ............... H04L 69/323 370/329 |
| 2016/0072654 A1* | 3/2016 | Choi .................. H04L 27/2602 370/329 |
| 2016/0142122 A1 | 5/2016 | Merlin et al. |

FOREIGN PATENT DOCUMENTS

| | | |
|---|---|---|
| CN | 102577207 A | 7/2012 |
| CN | 103069737 A | 4/2013 |
| CN | 103229582 A | 7/2013 |
| CN | 103444117 A | 12/2013 |
| CN | 104066145 A | 9/2014 |
| CN | 105337705 A | 2/2016 |
| CN | 105684335 A | 6/2016 |
| CN | 105706386 A | 6/2016 |
| EP | 01089498 A2 | 4/2001 |
| JP | 2011-234356 A | 11/2011 |
| WO | WO-2013074917 A1 | 5/2013 |
| WO | WO-2013157787 A1 | 10/2013 |
| WO | WO-2015143686 A1 | 10/2015 |

* cited by examiner

FIG. 2

| L-STF | L-LTF | L-SIG | HEW-SIGA | HEW-STF (-1) | HEW-LTF (-1) | HEW-LTF (-1) | ⋯ | HEW-SIGB(-1) |
|---|---|---|---|---|---|---|---|---|
| | | | | HEW-STF (-1) | HEW-LTF (-1) | HEW-LTF (-1) | ⋯ | HEW-SIGB(-1) |
| | | | | HEW-STF (-1) | HEW-LTF (-1) | HEW-LTF (-1) | ⋯ | HEW-SIGB(-1) |
| | | | | HEW-STF (+1) | HEW-LTF (+1) | HEW-LTF (+1) | ⋯ | HEW-SIGB(+1) |

FIG. 5

| | | | | HEW-STF *(-1)* | HEW-LTF *(-1)* | HEW-LTF *(-1)* | ...... | HEW-SIGB*(-1)* |
|L-STF *(+j)*|L-LTF *(+j)*|L-SIG *(+j)*|HEW-SIGA *(+j)*| HEW-STF *(-1)* | HEW-LTF *(-1)* | HEW-LTF *(-1)* | ...... | HEW-SIGB*(-1)* |
| | | | | HEW-STF *(-1)* | HEW-LTF *(-1)* | HEW-LTF *(-1)* | ...... | HEW-SIGB*(-1)* |
| | | | | HEW-STF *(+1)* | HEW-LTF *(+1)* | HEW-LTF *(+1)* | ...... | HEW-SIGB(*+1*) |
| | | | | HEW-STF *(-1)* | HEW-LTF *(-1)* | HEW-LTF *(-1)* | ...... | HEW-SIGB*(-1)* |
|L-STF *(+1)*|L-LTF *(+1)*|L-SIG *(+1)*|HEW-SIGA *(+1)*| HEW-STF *(-1)* | HEW-LTF *(-1)* | HEW-LTF *(-1)* | ...... | HEW-SIGB*(-1)* |
| | | | | HEW-STF *(-1)* | HEW-LTF *(-1)* | HEW-LTF *(-1)* | ...... | HEW-SIGB*(-1)* |
| | | | | HEW-STF *(+1)* | HEW-LTF *(+1)* | HEW-LTF *(+1)* | ...... | HEW-SIGB(*+1*) |

FIG. 6

| L-STF (-1) | L-LTF (-1) | L-SIG (-1) | HEW-SIGA (-1) | HEW-STF (-1) | HEW-LTF (-1) | HEW-LTF (-1) | ...... | HEW-SIGB(-1) |
|---|---|---|---|---|---|---|---|---|
| | | | | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (+1) | HEW-LTF (+1) | HEW-LTF (+1) | ...... | HEW-SIGB(+1) |
| L-STF (-1) | L-LTF (-1) | L-SIG (-1) | HEW-SIGA (-1) | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (+1) | HEW-LTF (+1) | HEW-LTF (+1) | ...... | HEW-SIGB(+1) |
| L-STF (-1) | L-LTF (-1) | L-SIG (-1) | HEW-SIGA (-1) | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (+1) | HEW-LTF (+1) | HEW-LTF (+1) | ...... | HEW-SIGB(+1) |
| L-STF (+1) | L-LTF (+1) | L-SIG (+1) | HEW-SIGA (+1) | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (-1) | HEW-LTF (-1) | HEW-LTF (-1) | ...... | HEW-SIGB(-1) |
| | | | | HEW-STF (+1) | HEW-LTF (+1) | HEW-LTF (+1) | ...... | HEW-SIGB(+1) |

FIG. 7

METHOD AND DEVICE FOR TRANSMITTING DATA

CROSS-REFERENCE TO RELATED APPLICATIONS

The present application is a Continuation Application (Bypass Continuation Application) of a currently pending international application No. PCT/IB2015/001260 having an international filing date of 26 Jun. 2015 and designating the United States, the international application claiming priority to the following earlier filed Korean patent application No. 10-2014-0080171 filed on Jun. 27, 2014. The entire contents of the aforesaid international application and the afore-listed Korean patent applications are incorporated herein by reference. The applicant claims the benefit of and claims priory herein to the aforesaid international application and the afore-listed Korean patent applications and their filing dates and priority dates.

BACKGROUND OF THE INVENTION

Field of the Invention

The present invention relates to wireless communications, and more particularly, to a method and device for transmitting data in a wireless local area network.

Related Art

Institute of Electrical and Electronics Engineers (IEEE) 802.11n standard established in 2009 provides a transfer rate of up to 600 Mbps at a frequency band of 2.4 GHz or 5 GHz on the basis of Multiple Input Multiple Output (MIMO) technique.

IEEE 802.11ac standard established in 2013 aims to provide a throughput greater than or equal to 1 Gbps utilizing Medium Access Control (MAC) Service Access Point (SAP) layer scheme at a frequency band less than or equal to 6 GHz. A system supporting IEEE 802.11ac standard is referred to as a Very High Throughput (VHT) system.

There are continuing efforts to implement more effective Wireless Local Area Network (WLAN) technologies in increasingly congested environments.

SUMMARY OF THE INVENTION

The present invention provides a method for transmitting data in a wireless local area network.

The present invention also provides a device transmitting data in a wireless local area network.

In an aspect, a method for transmitting data in a wireless local area network is provided. The method includes determining, by a transmitting station, whether a plurality of medium access control protocol data units (MPDUs) for at least one receiving station is to be transmitted via a single channel or a plurality of subchannels, each of the plurality of MPDUs including a duration field indicating a duration of a corresponding MPDU to update a network allocation vector, if it is determined that the plurality of MPDUs for the at least one receiving station is to be transmitted via the single channel, transmitting, by the transmitting station, the plurality of MPDUs to the at least one receiving station via the single channel, and if it is determined that the plurality of MPDUs for the at least one receiving station is to be transmitted via the plurality of subchannels, transmitting, by the transmitting station, the plurality of MPDUs to the at least one receiving station via the plurality of subchannels, at least one MPDU being transmitted via at least one of the plurality of subchannels corresponding to a corresponding one of the at least one receiving station.

Duration fields in all of the plurality of MPDUs may be set to a same value.

In another aspect, a device configured for transmitting data in a wireless local area network is provided. The device includes a radio frequency module configured to transmit and receive radio signals, and a processor operatively coupled with the radio frequency module and configured to determine whether a plurality of medium access control protocol data units (MPDUs) for at least one receiving station is to be transmitted via a single channel or a plurality of subchannels, each of the plurality of MPDUs including a duration field indicating a duration of a corresponding MPDU to update a network allocation vector, if it is determined that the plurality of MPDUs for the at least one receiving station is to be transmitted via the single channel, instruct the radio frequency module to transmit the plurality of MPDUs to the at least one receiving station via the single channel, and if it is determined that the plurality of MPDUs for the at least one receiving station is to be transmitted via the plurality of subchannels, instruct the radio frequency module to transmit the plurality of MPDUs to the at least one receiving station via the plurality of subchannels, at least one MPDU being transmitted via at least one of the plurality of subchannels corresponding to a corresponding one of the at least one receiving station.

Since a greater amount of data can be transmitted during a same time period, a transmission efficiency can be increased. In addition, a Peak-to-Average Power Ratio (PAPR) of a transmitter can be decreased.

BRIEF DESCRIPTION OF THE DRAWINGS

FIG. 2 shows an HEW PPDU format according to an embodiment of the present invention.

FIG. 5 shows an HEW PPDU format in a 20 MHz channel.

FIG. 6 shows an HEW PPDU format in a 40 MHz channel.

FIG. 7 shows an HEW PPDU format in an 80 MHz channel.

DESCRIPTION OF EXEMPLARY EMBODIMENTS

The proposed wireless local area network (WLAN) system may operate at a band less than or equal to 6 GHz or at a band of 60 GHz. The operating band less than or equal to 6 GHz may include at least one of 2.4 GHz and 5 GHz.

For clarity, a system complying with the Institute of Electrical and Electronics Engineers (IEEE) 802.11a/g standard is referred to as a non-High Throughput (non-HT) system, a system complying with the IEEE 802.11n standard is referred to as a High Throughput (HT) system, and a system complying with IEEE 802.11ac standard is referred to as a Very High Throughput (VHT) system. In comparison thereto, a WLAN system complying with the proposed method is referred to as a High Efficiency WLAN (HEW) system. A WLAN system supporting systems used before the HEW system is released is referred to as a legacy system. The HEW system may include an HEW Station (STA) and an HEW Access Point (AP). The term HEW is only for the purpose of distinguishing from the conventional WLAN, and there is no restriction thereon. The HEW system may support IEEE 802.11/a/g/n/ac by providing backward compatibility in addition to the proposed method.

Hereinafter, unless a function of a station (STA) is additionally distinguished from a function of an Access Point (AP), the STA may include a non-AP STA and/or the AP. When it is described as an STA-to-AP communication, the STA may be expressed as the non-AP STA, and may correspond to communication between the non-AP STA and the AP. When it is described as STA-to-STA communication or when a function of the AP is not additionally required, the STA may be the non-AP STA or the AP.

A Physical layer Protocol Data unit (PPDU) is a data unit for data transmission.

Figure 1:
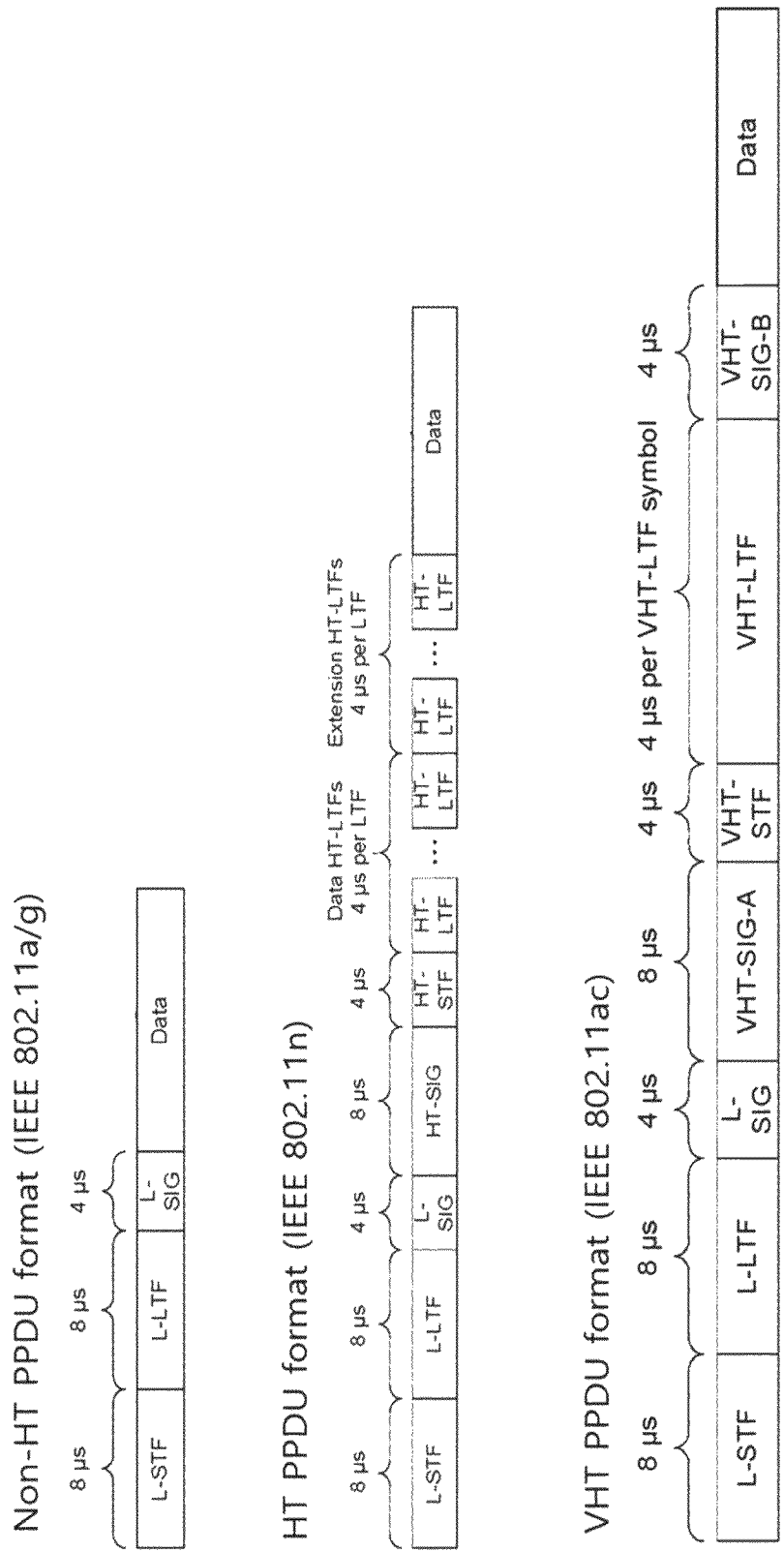
FIG. 1 shows PPDU formats used by the legacy system.

FIG. 1 shows PPDU formats used by the legacy system.

A non-HT PPDU supporting IEEE 802.11a/g includes a Legacy-Short Training Field (L-STF), a Legacy-Long Training Field (L-LTF), and a Legacy-Signal (L-SIG).

An HT PPDU supporting IEEE 802.11n includes a HT-SIG, a HT-STF, and a HT-LTF after the L-SIG.

A VHT PPDU supporting IEEE 802.11ac includes a VHT-SIG-A, a VHT-STF, a VHT-LTF, and a VHT-SIG-B after the L-SIG.

Figure 2:
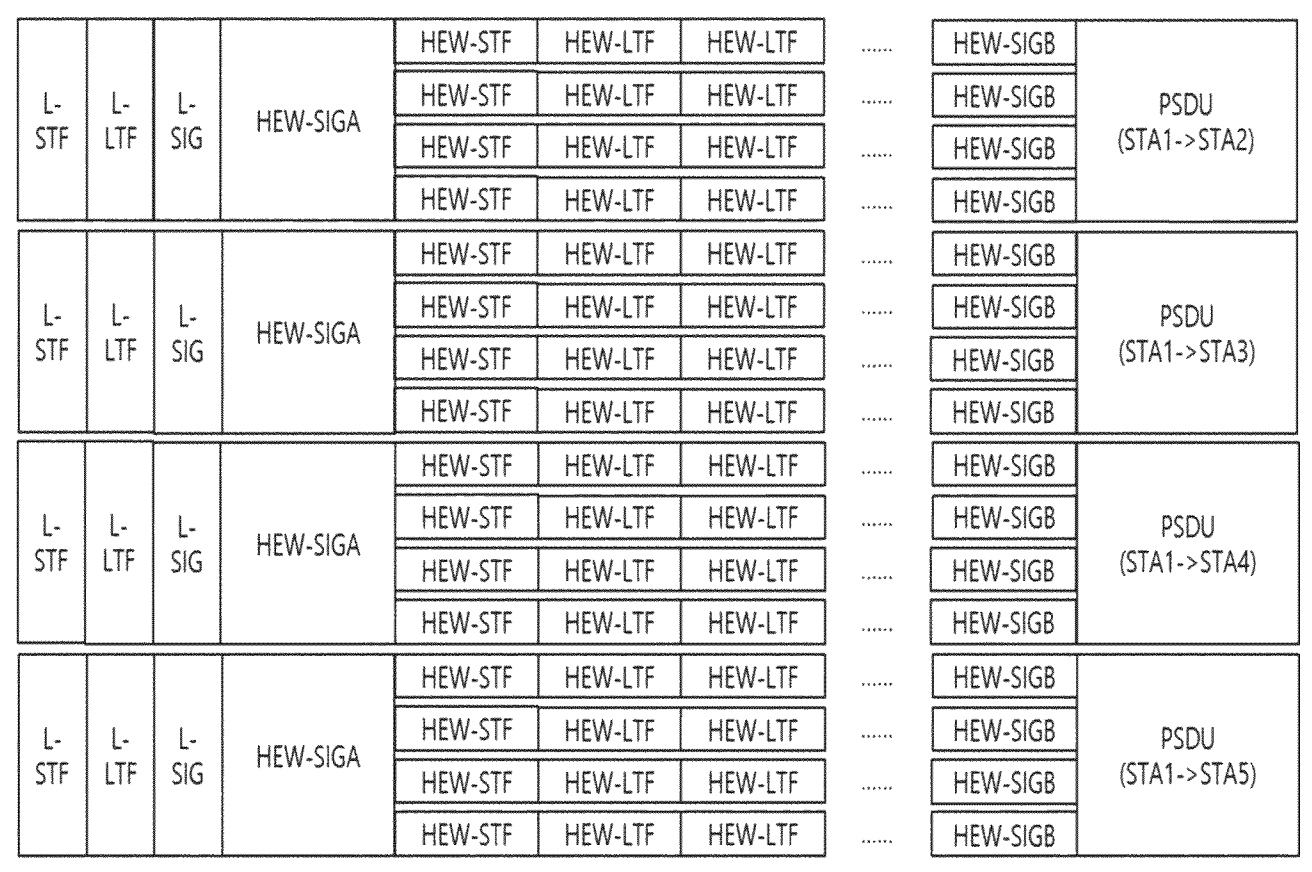

FIG. 2 shows an HEW PPDU format according to an embodiment of the present invention.

An L-STF may be used for frame detection, Automatic Gain Control (AGC), diversity detection, and coarse frequency/time synchronization.

An L-LTF may be used for fine frequency/time synchronization and channel estimation.

An L-SIG may include information indicating a total length of a corresponding PPDU (or information indicating a transmission time of a physical layer protocol service unit (PSDU)).

The L-STF, the L-LTF and the L-SIG may be identical to L-STF, L-LTF and L-SIG of the VHT system. The L-STF, the L-LTF and the L-SIG may be referred to as a legacy portion. The L-STF, the L-LTF, and the L-SIG may be transmitted in at least one Orthogonal Frequency Division Multiplexing (OFDM) symbol generated on the basis of 64-points Fast Fourier Transform (FFT) (or 64 subcarriers) in each 20 MHz channel. For 20 MHz transmission, the legacy portion may be generated by performing an inverse Discrete Fourier Transform (IDFT) with 64 FFT points. For 40 MHz transmission, the legacy portion may be generated by performing an IDFT with 128 FFT points. For 80 MHz transmission, the legacy portion may be generated by performing an IDFT with 512 FFT points.

A HEW-SIGA may include common control information commonly received by an STA which receives a PPDU. The HEW-SIGA may be transmitted in 2 OFDM symbols or 3 OFDM symbols.

The following table exemplifies information included in the HEW-SIGA. A field name or the number of bits is for exemplary purposes only.

TABLE 1

| Field | Bits | Description |
|---|---|---|
| Bandwidth | 2 | Set to 0 for 20 MHz, 1 for 40 MHz, 2 for 80 MHz, 3 for 160 MHz and 80 + 80 MHz mode |
| STBC | 1 | Set to 1 if all streams use STBC, otherwise set to 0. When STBC bit is 1, an odd number of space time streams per user is not allowed. |
| Group ID | 6 | Set to the value of the TXVECTOR parameter GROUP_ID. A value of 0 or 63 indicates a HEW SU PPDU; otherwise, indicates a HEW MU PPDU. |
| Nsts/ Partial AID | 12 | For MU: 3 bits/user with maximum of 4 users<br>Set to 0 for 0 space time streams<br>Set to 1 for 1 space time stream<br>Set to 2 for 2 space time streams<br>Set to 3 for 3 space time streams<br>Set to 4 for 4 space time streams<br>Otherwise: first 3 bits contain stream allocation for SU, set to 0 for 1 space time stream, set to 1 for 2 space time streams, etcetera up to 8 streams. Remaining 9 bits contain partial association identifier (AID). |
| No TXOP PS | 1 | Set to 1 to indicate that TXOP PS is not allowed. Set to 0 to indicate that TXOP PS is allowed. Set to the same value in all PPDUs in downlink MU TXOP. |
| GI (Guard interval) | 2 | Set B0 to 0 for Long GI, set to 1 for Short GI. Set B1 to 1 when Short GI. |
| Coding | 2 | For SU:<br>Set B2 to 0 for BCC, set to 1 for LDPC<br>For MU:<br>Set B2 to 0 for BCC, set to 1 for LDPC for 1st user<br>If user 1 has 0 Nsts value, then B2 is reserved and set to 1 |
| MCS | 4 | For SU/Broadcast/Multicast: Modulation and coding scheme (MCS) index<br>For MU:<br>B1: Set to 0 for BCC, 1 for LDPC for the 2nd user<br>B2: Set to 0 for BCC, 1 for LDPC for the 3rd user<br>B3: Set to 0 for BCC, 1 for LDPC for the 4th user<br>If user 2, 3, or 4 has 0 Nsts value, then corresponding bit is reserved and set to 1 |
| SU-Beamformed | 1 | Set to 1 when packet is a SU-beamformed packet<br>Set to 0 otherwise<br>For MU: Reserved, set to 1 |
| CRC | 8 | |
| Tail | 6 | All zeros |

A HEW-STF may be used to improve an AGC estimation in an MIMO transmission.

A HEW-LTF may be used to estimate a MIMO channel. The HEW-LTF may start at the same point of time and may end at the same point of time across all users.

A HEW-SIGB may include user-specific information required for each STA to receive its PSDU. For example, the HEW-SIGB may include information regarding a length of a corresponding PSDU and/or a bandwidth or channel in which the PSDU for a corresponding receiver is transmitted.

A data portion may include at least one PSDU. The position of the HEW-SIGB is illustration purpose only. The HEW-SIGB may be followed by the data portion. The HEW-SIGB may be followed by the HEW-STF or the HEW-LTF.

In the proposed PPDU format, the number of OFDM subcarriers may be increased per unit frequency. The number of OFDM subcarriers may increase K-times by increasing FFT size. K may be 2, 4, or 8. This increase may be accomplished via downclocking (e,g, using a larger FFT size with a same sampling rate).

For example, K=4 downclocking is assumed. As for the legacy portion, 64 FFT is used in a 20 MHz channel, 128

FFT is used in a 40 MHz channel, and 256 FFT is used in an 80 MHz channel. As for a HEW portion using the larger FFT size, 256 FFT is used in a 20 MHz channel, 512 FFT is used in a 40 MHz channel, and 1024 FFT is used in an 80 MHz channel. The HEW-SIGA may have same FFT size as the legacy portion. The HEW portion may have larger FFT size than the legacy portion.

The PPDU is generated by performing IDFT with two different FFT sizes. The PPDU may include a first part with a first FFT size and a second part with a second FFT size. The first part may include at least one of the L-STF, the L-LTF, the L-SIG and the HEW-SIGA. The second part may include at least one of the HEW-STF, the HEW-LTF and the data portion. The HEW-SIGB may be included in the first part or in the second part.

When an FFT size is increased, an OFDM subcarrier spacing is decreased and thus the number of OFDM subcarriers per unit frequency is increased, but an OFDM symbol duration is increased. A guard interval (GI) (or also referred to as a Cyclic Prefix (CP) length) of the OFDM symbol time can be decreased when the FFT size is increased.

If the number of OFDM subcarriers per unit frequency is increased, a legacy STA supporting the conventional IEEE 80.2.11 a/g/n/ac cannot decode a corresponding PPDU. In order for the legacy STA and an HEW STA to co-exist, L-STF, L-LTF, and L-SIG are transmitted through 64 FFT in a 20 MHz channel so that the legacy STA can receive the L-STF, the L-LTF, and the L-SIG. For example, the L-SIG is transmitted in a single OFDM symbol, a symbol time of the single OFDM symbol is 4 micro seconds (us), and the GI is 0.8 us.

Although the HEW-SIGA includes information required to decode an HEW PPDU by the HEW STA, the HEW-SIGA may be transmitted through 64 FFT in an 20 MHz channel so that it can be received by both of the legacy STA and the HEW STA. This is to allow the HEW STA to receive not only the HEW PPDU but also the conventional non-HT/HT/VHT PPDU.

Figure 3:
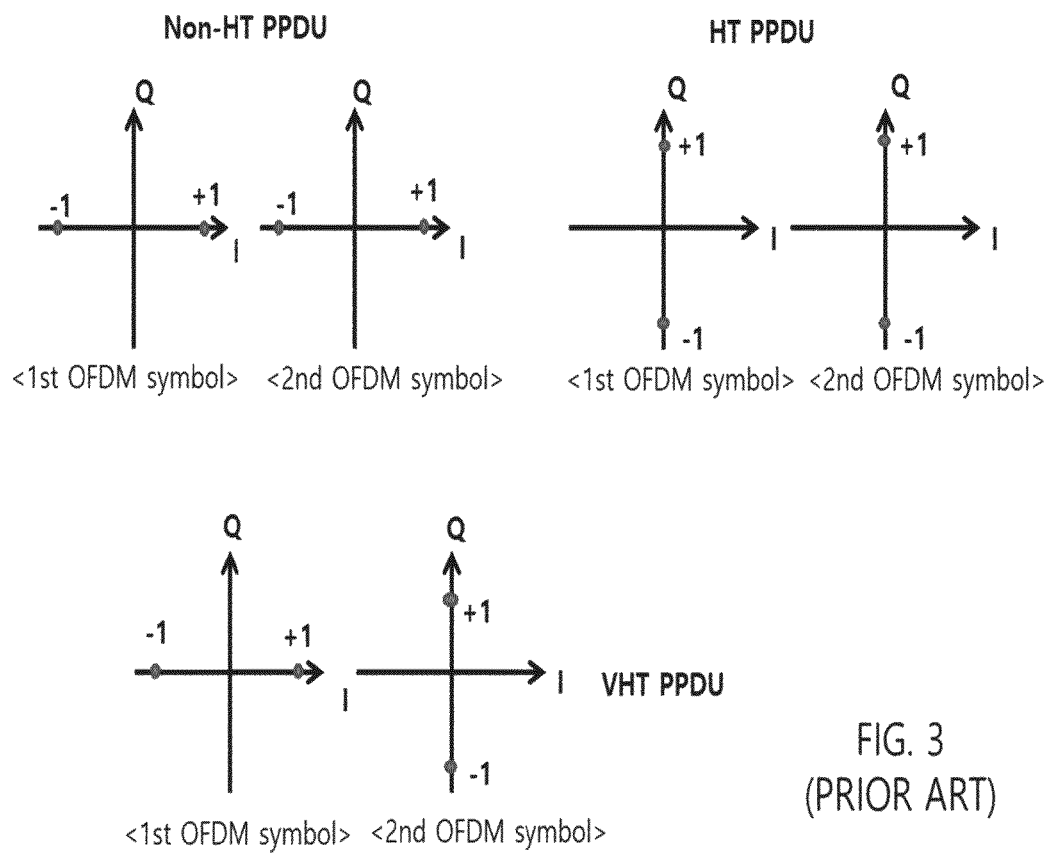
FIG. 3 shows constellation phases for the conventional PPDU.

FIG. 3 shows constellation phases for the conventional PPDU.

To identify a format of a PPDU, a phase of a constellation for two OFDM symbols transmitted after L-STF, L-LTF, and L-SIG is used.

A 'first OFDM symbol' is an OFDM symbol first appeared after the L-SIG. A 'second OFDM symbol' is an OFDM symbol subsequent to the first OFDM symbol.

In a non-HT PPDU, the same phase of the constellation is used in the 1st OFDM symbol and the 2nd OFDM symbol. Binary Phase Shift Keying (BPSK) is used in both of the 1st OFMD symbol and the 2nd OFDM symbol.

In an HT PPDU, although the same phase of the constellation is used in the 1st OFDM symbol and the 2nd OFDM symbol, the constellation rotates by 90 degrees in a counterclockwise direction with respect to the phase used in the non-HT PPDU. A modulation scheme having a constellation which rotates by 90 degrees is called Quadrature Binary Phase Shift Keying (QBPSK).

In a VHT PPDU, a constellation of the first OFDM symbol is identical to that of the non-HT PPDU, whereas a constellation of the second OFDM symbol is identical to that of the HT PPDU. The constellation of second OFDM symbol rotates 90 degrees in a counterclockwise direction with respect to the 1st OFDM symbol. The first OFDM symbol uses BPSK modulation, and the 2nd OFDM symbol uses QBPSK modulation. Since VHT-SIG-A is transmitted after L-SIG and the VHT-SIG-A is transmitted in two OFDM symbols, the first OFDM symbol and the second OFDM symbol are used to transmit the VHT-SIG-A.

Figure 4:
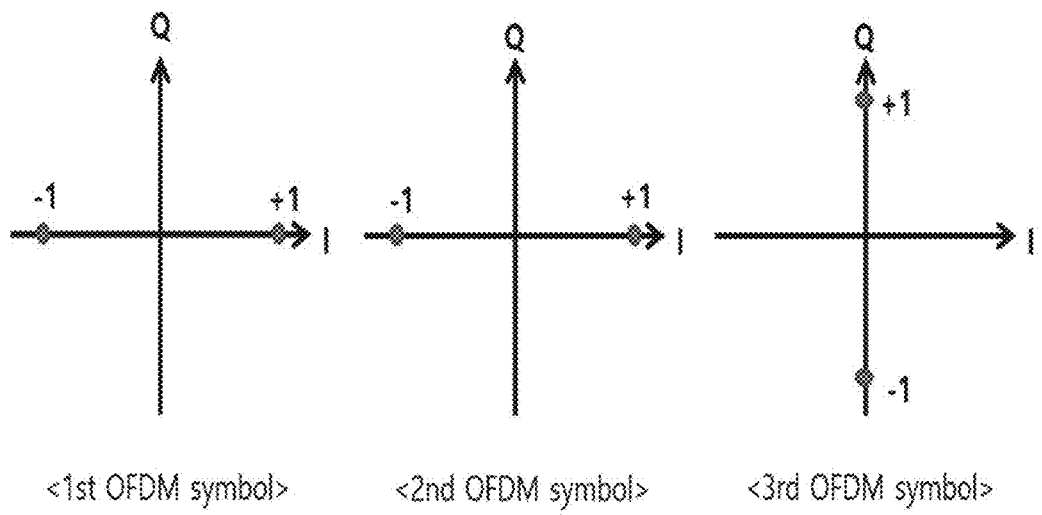
FIG. 4 shows constellation phases for a proposed HEW PPDU.

FIG. 4 shows constellation phases for a proposed HEW PPDU.

To distinguish from a non-HT/HT/VHT PPDU, a constellation of at least one OFDM symbol transmitted after L-SIG can be used.

Just like the non-HT PPDU, a first OFDM symbol and a second OFDM symbol of the HEW PPDU have the same constellation phase. A BPSK modulation may be used for the first OFDM symbol and the second OFDM symbol. The STA can differentiate the HEW PPDU and HT/VHT PPDUs.

In an embodiment, to differentiate the HEW PPDU and the non-HT PPDU, the constellation of a third OFDM symbol can be utilized. The constellation of the third OFDM symbol may rotate by 90 degrees in a counterclockwise direction with respect to the second OFDM symbol. The first and second OFDM symbols may use BPSK modulation, but the third OFDM symbol may use QBPSK modulation.

In another embodiment, the HEW-SIGA may provide an indication about the format of the PPDU. The indication may indicate whether the format of the PPDU is a HEW PPDU. The HEW-SIGA may provide an indication about a use of orthogonal frequency division multiple access (OFDMA).

Hereinafter, a PPDU using a phase rotation in frequency domain is proposed in order to support lower Peak-to-Average Power Ratio (PAPR).

For clarity, it is assumed that the second part (i.e. HEW part) of the PPDU uses 4-times FFT size via downclocking.

Hereinafter, a subchannel refers to a resource allocation unit to be allocated to a STA. Operating bandwidth (i.e. 20 MHz channel, 40 MHz channel, 80 MHz channel or 160 MHz channel) can be divided into a plurality of subchannels. A subchannel may include one or more subcarriers. The plurality of subchannels may have same number of subcarriers or different number of subcarriers. One or more subchannels can be allocated to the STA. The STA can transmit one or more PPDUs through the allocated subchannels. The subchannel may be referred to as 'a subband' or 'a subgroup'.

FIG. 5 shows an HEW PPDU format in a 20 MHz channel.

The first part (i.e. L-LTF, L-LTF, L-SIG and HEW-SIGA) uses 64 FFT in the 20 MHz channel. In order to implement the 256 FFT in the second part, it is proposed to decrease an overhead by performing ¼ down-clocking on a VHT 80 MHz PPDU format and by decreasing GI to 0.8 us and 0.4 us.

If the VHT 80 MHz PPDU format is subjected to ¼ down-clocking, an OFDM symbol time is increased by four times, and thus is 16 us when using Long GI, and is 14.4 us when using Short GI. That is, the GI is also increased to 3.2 us in case of Long GI and to 1.6 us in case of Short GI. However, the GI may keep to 0.8 us in case of Long GI and to 0.4 us in case of Short GI. In doing so, after performing the ¼ downclocking, the OFDM symbol time is 13.6 us when using Long GI and is 13.2 us when using Short GI.

If the VHT 80 MHz PPDU format is subjected to ¼ down-clocking in the 20 MHz channel, each of 64 FFT-based VHT-STF, VHT-LTF, and VHT-SIG-B may constitute one subchannel, and as a result, 4 subchannels are combined and transmitted through the 20 MHz channel in unit of 256 FFT.

In FIG. 5, in order to decrease a Peak-to-Average Power Ratio (PAPR) of a transmitter STA, the second part may be subjected to multiplication for a phase waveform in unit of subchannel as follows.

$$R(k) = \begin{cases} -1, k \geq -64 \\ +1, k < -64 \end{cases}$$ [Equation 1]

Herein, R(k) denotes a multiplication value for a phase waveform at a subcarrier index k. 256 subcarriers are divided into 4 subchannels. Respective subchannel is composed of 64 subcarriers. A sequence {+1, −1, −1, −1} may be multiplied for the 4 subchannels, starting from a subchannel having a smallest subcarrier index, that is, a lowermost subchannel. The number of subchannels and the sequence {+1, −1, −1, −1} are exemplary purpose only. 256 subcarriers may be divided into a plurality of subchannels and respective subchannel may be phase-rotated by multiplying +1 or −1.

The equation 1 can be expressed as follows. The 256 subcarriers are divided into first and second subgroups that have different number of subcarriers. The first subgroup is phase-rotated by multiplying +1 and the second subgroup is phase-rotated by multiplying −1.

A sequence constituting the HEW-STF and the HEW-LTF may be as follows.

HEW-STF={HTS$_{-58,58}$, 0, 0, 0, 0, 0, 0, 0, 0, 0, 0, 0, HTS$_{-58,58}$},

HEW-LTF={LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright} where:

HTS$_{-58,58}$=
  √1/2{0,0,1+j,0,0,0,−1−j,0,0,0,1+j,0,0,0,−1−j,0,0,0,−1−j,0,0,0,1+
  j,0,0,0,0,0,0,0,−1−j,0,0,0,−1−j,0,0,0,1+j,0,0,0,1+
  j,0,0,0,1+j0,0,0,1+j,0,0,0,0,0,0,0,0,0,0,0,0,0,
  1+j,0,0,0,−1−j,0,0,01+j,0,0,0,−−j,0,0,0,−1−j,0,0,
  0,1+j,0,0,0,0,0,0,0,−1−j,0,0,0,−1−j,0,0,0,1+j,0,0,
  0,1+j,0,0,0,1+j,0,0}.

LTFleft={1, 1, −1, −1, 1, 1, −1, 1, −1, 1, 1, 1, 1, 1, 1, −1, −1, 1, 1, −1, 1, −1, 1, 1, 1, 1}, LTFright={1, −1, −1, 1, 1, −1, 1, −1, 1, −1, −1, −1, −1, −1, 1, 1, −1, −1, 1, −1, 1, −1, 1, 1, 1, 1}.

FIG. 6 shows an HEW PPDU format in a 40 MHz channel.

In order to implement the 512 FFT in the 40 MHz channel, it is proposed to use two blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA are generated using 64 FFT and are transmitted in a duplicated manner two times in the 40 MHz channel. That is, the first part is transmitted in a first 20 MHz subchannel and its duplication is transmitted in a second 20 MHz subchannel.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} +j, k \geq 0 \\ +1, k < 0 \end{cases}$$ [Equation 2]

This means that the first part is phase-rotated by multiplying +1 for the first 20 MHz subchannel and is phase-rotated by multiplying +j for the second 20 MHz subchannel.

The equation 2 can be expressed as follows. The 128 subcarriers are divided into first and second subgroups. The first subgroup is phase-rotated by multiplying +1 and the second subgroup is phase-rotated by multiplying +j.

For each 64 FFT-based subchannel constituting 512 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, 64 \leq k \\ +1, 0 \leq k < 64 \\ -1, -192 \leq k < 0 \\ +1, k < -192 \end{cases}$$ [Equation 3]

More specifically, according to Equation 3, 512 subcarriers are divided into 8 subchannels. Respective subchannel is composed of 64 subcarriers. A sequence {+1, −1, −1, −1, +1, −1, −1, −1} may be multiplied for the 8 subchannels, starting from a subchannel having a smallest subcarrier index, that is, a lowermost subchannel.

The equation 3 can be expressed as follows. The 512 subcarriers are divided into four subgroups. The first subgroup is phase-rotated by multiplying +1, the second subgroup is phase-rotated by multiplying −1, the third subgroup is phase-rotated by multiplying +1, and the fourth subgroup is phase-rotated by multiplying −1.

A sequence constituting the HEW-STF and the HEW-LTF may be as follows.

HEW-STF={HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$, 0, 0, 0, 0, 0, 0, 0, 0, 0, 0, 0, HTS$_{-58,58}$},

HEW-LTF={LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, −1, 1, 1, −1, LTFleft, 1, LTFright, 0, 0, 0, 0, 0, 0, 0, 0, 0, 0, 0, LTFleft, 1, LTFright, −1, −1, −1, 1, 1, −1, 1, −1, 1, 1, −1, LTFleft, 1, LTFright, 1, −1, 1, −1, 0, 0, 0, 1, −1, −1, 1, LTFleft, 1, LTFright, −1, −1, −1, 1, 1, −1, 1, 1, −1, 1, −1, LTFleft, 1, LTFright}

Herein,

HTS$_{-58,58}$=
  √1/2{0,0,1+j,0,0,0,−1−j,0,0,0,1+j,0,0,0,−1−j,0,0,0,−1−j,0,0,0,1+
  j,0,0,0,0,0,0,0,−1−j,0,0,0,−1−j,0,0,0,1+j,0,0,0,1+
  j,0,0,0,1+j0,0,0,1+j,0,0,0,0,0,0,0,0,0,0,0,0,0,
  1+j,0,0,0,−1−j,0,0,01+j,0,0,0,−−j,0,0,0,−1−j,0,0,
  0,1+j,0,0,0,0,0,0,0,−1−j,0,0,0,−1−j,0,0,0,1+j,0,0,
  0,1+j,0,0,0,1+j,0,0}.

LTFleft={1, 1, −1, −1, 1, 1, −1, 1, −1, 1, 1, 1, 1, 1, 1, −1, −1, 1, 1, −1, 1, −1, 1, 1, 1, 1}, LTFright={1, −1, −1, 1, 1, −1, 1, −1, 1, −1, −1, −1, −1, −1, 1, 1, −1, −1, 1, −1, 1, −1, 1, 1, 1, 1}.

FIG. 7 shows an HEW PPDU format in an 80 MHz channel.

In order to implement the 1024 FFT in the 80 MHz channel, it is proposed to use four blocks for the aforementioned 256 FFT transmission of the 20 MHz channel. Like in the 256 FFT transmission in the 20 MHz channel, an OFDM symbol time is 13.6 us when using Long GI, and is 13.2 us when using Short GI.

L-STF, L-LTF, L-SIG, and HEW-SIGA which are transmitted using 64 FFT are also transmitted in a duplicated manner four times in the 80 MHz channel. That is, the first part is transmitted in a first 20 MHz subchannel and its duplications are transmitted in second, third and fourth 20 MHz subchannels respectively.

In order to decrease a PAPR of a transmitter STA for transmitting the L-STF, the L-LTF, the L-SIG, and the HEW-SIGA, multiplication may be performed on a phase waveform in unit of 20 MHz channel as follows.

$$R(k) = \begin{cases} -1, k \geq -64 \\ +1, k < -64 \end{cases} \quad \text{[Equation 4]}$$

This means that the first part is phase-rotated by multiplying +1 for the first 20 MHz subchannel and is phase-rotated by multiplying −1 for the second, third and fourth 20 MHz subchannels.

The equation 4 can be expressed as follows. The 256 subcarriers are divided into first and second subgroups that have different number of subcarriers. The first subgroup is phase-rotated by multiplying +1 and the second subgroup is phase-rotated by multiplying −1.

For each 64 FFT-based subchannel constituting 1024 FFT, in order to decrease a PAPR of a transmitter STA for transmitting HEW-STF, HEW-LTF, and HEW-SIGB, multiplication may be performed on a phase waveform in unit of subchannel as follows.

$$R(k) = \begin{cases} -1, 256 \leq k \\ +1, 192 \leq k < 256 \\ -1, 64 \leq k < 192 \\ +1, 0 \leq k 64 \\ -1, -192 \leq k < 0 \\ +1, 256 \leq k \leq -192 \\ -1, -448 \leq k < -256 \\ +1, k < -448 \end{cases} \quad \text{[Equation 5]}$$

More specifically, according to Equation 5, 1024 subcarriers are divided into 16 subchannels. Respective subchannel is composed of 64 subcarriers. A sequence {+1, −1, −1, −1, +1, −1, −1, −1, +1, −1, −1, −1, +1, −1, −1, −1} may be multiplied for the 16 subchannels, starting from a subchannel having a smallest subcarrier index, that is, a lowermost subchannel.

The equation 5 can be expressed as follows. The 1024 subcarriers are divided into 8 subgroups. The first subgroup is phase-rotated by multiplying +1, the second subgroup is phase-rotated by multiplying −1, the third subgroup is phase-rotated by multiplying +1, the fourth subgroup is phase-rotated by multiplying −1, the fifth subgroup is phase-rotated by multiplying +1, the sixth subgroup is phase-rotated by multiplying −1, the seventh subgroup is phase-rotated by multiplying +1 and the eighth subgroup is phase-rotated by multiplying −1.

A sequence constituting the HEW-STF and the HEW-LTF is as follows.

$HEW\text{-}STF = \{HTS_{-58,58}, 0,0,0,0,0,0,0,0,0,0,0, HTS_{-58,58}, 0,0,0,0,0,0,0,0,0,0,0,0, HTS_{-58,58}, 0,0,0,0,0,0,0,0,0, 0,0,0, HTS_{-58,58}, 0,0,0,0,0,0,0,0,0,0,0,0, HTS_{-58,58}, 0, 0,0,0,0,0,0,0,0,0,0, HTS_{-58,58}, 0,0,0,0,0,0,0,0,0,0,0,0, 0, HTS_{-58,58}, 0,0,0,0,0,0,0,0,0,0,0,0, HTS_{-58,58}\}$, $HEW\text{-}LTF = \{LTFleft, 1, LTFright, -1, -1, -1, 1, 1, -1, 1, -1, 1, 1, -1, LTFleft, 1, LTFright, 1, -1, 1, -1, 0, 0, 0, 1, -1, -1, 1, LTFleft, 1, LTFright, -1, -1, -1, 1, 1, -1, 1, -1, 1, 1, -1, LTFleft, 1, LTFright, 0, 0, 0, 0, 0, 0, 0, 0, 0, 0, 0, LTFleft, 1, LTFright, -1, -1, -1, 1, 1, -1, 1, -1, 1, 1, -1, LTFleft, 1, LTFright, 1, -1, 1, -1, 0, 0, 0, 1, -1, -1, 1, LTFleft, 1, LTFright, -1, -1, -1, 1, 1, -1, 1, -1, 1, 1, -1, LTFleft, 1, LTFright, 0, 0, 0, 0, 0, 0, 0, 0, 0, 0, 0, LTFleft, 1, LTFright, -1, -1, -1, 1, 1, -1, 1, -1, 1, 1, -1, LTFleft, 1, LTFright, 1, -1, 1, -1, 0, 0, 0, 1, -1, -1, 1, LTFleft, 1, LTFright, -1, -1, -1, 1, 1, -1, 1, -1, 1, 1, -1, LTFleft, 1, LTFright, 0, 0, 0, 0, 0, 0, 0, 0, 0, 0, 0, LTFleft, 1, LTFright, -1, -1, -1, 1, 1, -1, 1, -1, 1, 1, -1, LTFleft, 1, LTFright, 1, -1, 1, -1, 0, 0, 0, 1, -1, -1, 1, LTFleft, 1, LTFright, -1, -1, -1, 1, 1, -1, 1, -1, 1, 1, -1, 1, 1, -1, LTFleft, 1, LTFright\}$, Herein, $HTS_{-58,58} = \sqrt{1/2}\{0,0,1+j,0,0,0,-1-j,0,0,0,1+j,0,0,0,-1-j,0,0,0,-1-j,0,0,0,1+j,0,0,0, 0,0,0,0,-1-j,0,0,0,-1-j,0,0,0,1+j,0,0,0,1+j, 0,0,0,1+j,0,0,0,1+j,0,0,0,0,0, 0,0,0,0,0,0,0,0,0,0, 1+j,0,0,0,-1-j,0,0,01+j,0,0,0,--j,0,0,0,-1-j,0,0, 0,1+j, 0,0,0,0,0,0,0,-1-j,0,0,0,-1-j,0,0,0,1+j,0,0, 0,1+j,0,0,0,1+j,0,0\}$.

$LTFleft = \{1, 1, -1, -1, 1, 1, -1, 1, -1, 1, 1, 1, 1, 1, -1, -1, 1, 1, -1, 1, -1, 1, 1, 1, 1\}$, $LTFright = \{1, -1, -1, 1, 1, -1, 1, -1, 1, -1, -1, -1, -1, -1, 1, 1, -1, -1, 1, -1, 1, -1, 1, 1, 1, 1\}$ An FFT size can be increased to improve PPDU transmission efficiency. In order to provide compatibility with the legacy STA, the first part (STF, LTF, L-SIG and HEW-SIGA) using the same FFT size as the legacy PPDU is first transmitted, and subsequently the second part (HEW-STF, HEW-LTF, HEW-SIGB and a PSDU) using a larger FFT size are transmitted.

In order to decrease a PAPR of a transmitter STA, the first part and the second part uses different phase rotation in frequency domain. It means that a phase rotation for subcarriers in the first part is different from a phase rotation for subcarriers in the second part.

Figure 8:
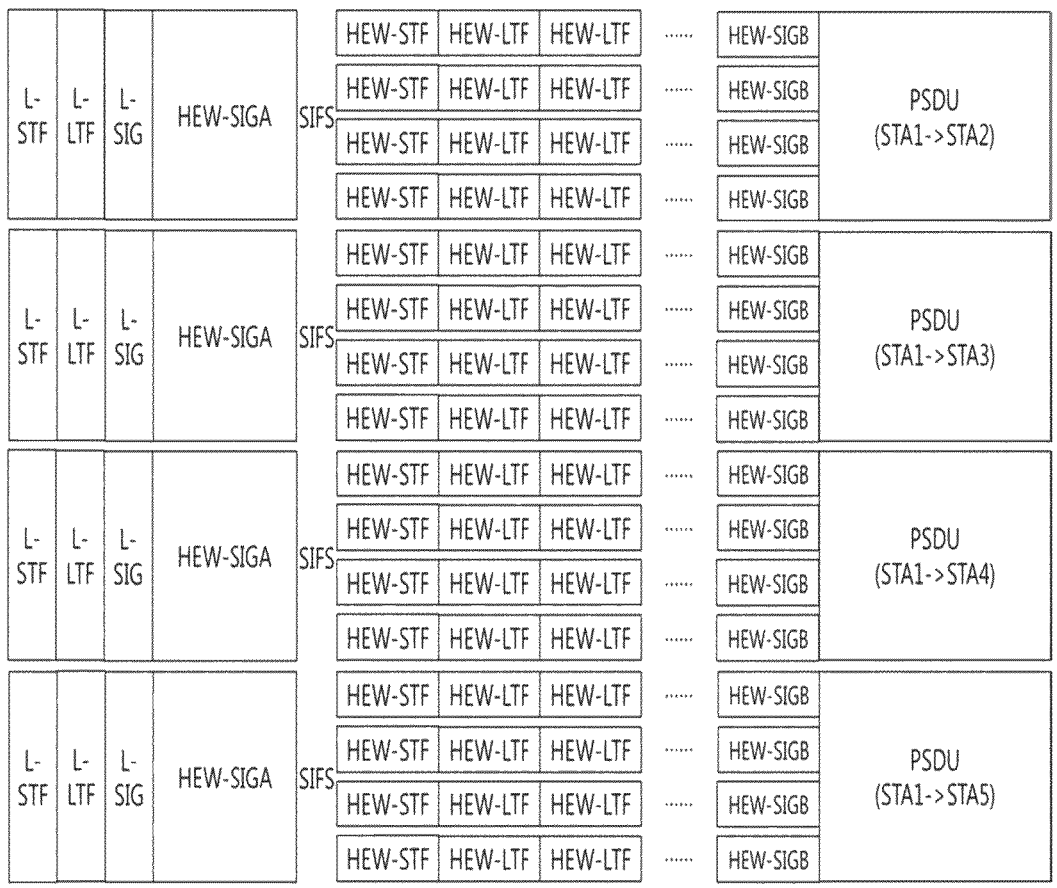
FIG. 8 shows a PPDU format according to another embodiment of the present invention.

FIG. 8 shows a PPDU format according to another embodiment of the present invention.

Since the number of OFDM subcarriers per unit frequency increases after transmitting L-STF, L-LTF, L-SIG, and HEW-SIGA, a processing time may be required to process data with larger FFT size. The processing time may be called an HEW transition gap.

In an embodiment, the HEW transition gap may be implemented by defining a Short Inter-Frame Space (SIFS) followed by the HEW-STF. The SIFS may be positioned between the HEW-SIGA and the HEW-STF. The SIFS may be positioned between the HEW-SIGB and the HEW-STF.

In another embodiment, the HEW transition gap may be implemented in such a manner that the HEW-STF is transmitted one more time. The duration of the HEW-STF may vary depending on the processing time or STA's capability. If the processing time is required, the duration of the HEW-STF may become double.

Hereinafter, a bandwidth signaling is described.

A transmitter STA may transmit a Request To Send (RTS) frame to a destination STA before transmitting an HEW PPDU. Further, the transmitter STA may receive a Clear To Send (CTS) frame from the destination STA as a response. A transmission bandwidth of the HEW PPDU may be determined using a bandwidth signal through RTS/CTS exchange between the transmitter STA and the destination STA.

If the transmitter STA performs Clear Channel Assessment (CCA) and if it is determined that a 40 MHz channel is idle, the RTS frame is transmitted through the 40 MHz channel. The destination STA receives the RTS frame only in the 20 MHz channel if only the 20 MHz channel is idle, and the destination STA responds with the CTS frame to the transmitter STA in the 20 MHz channel. Since the transmitter STA transmits the RTS frame through the 40 MHz channel but receives the CTS frame as a response only in the 20 MHz channel, a transmission bandwidth of an HEW PPDU may be less than or equal to a channel bandwidth in which a response is received using the CTS frame.

Figure 9:
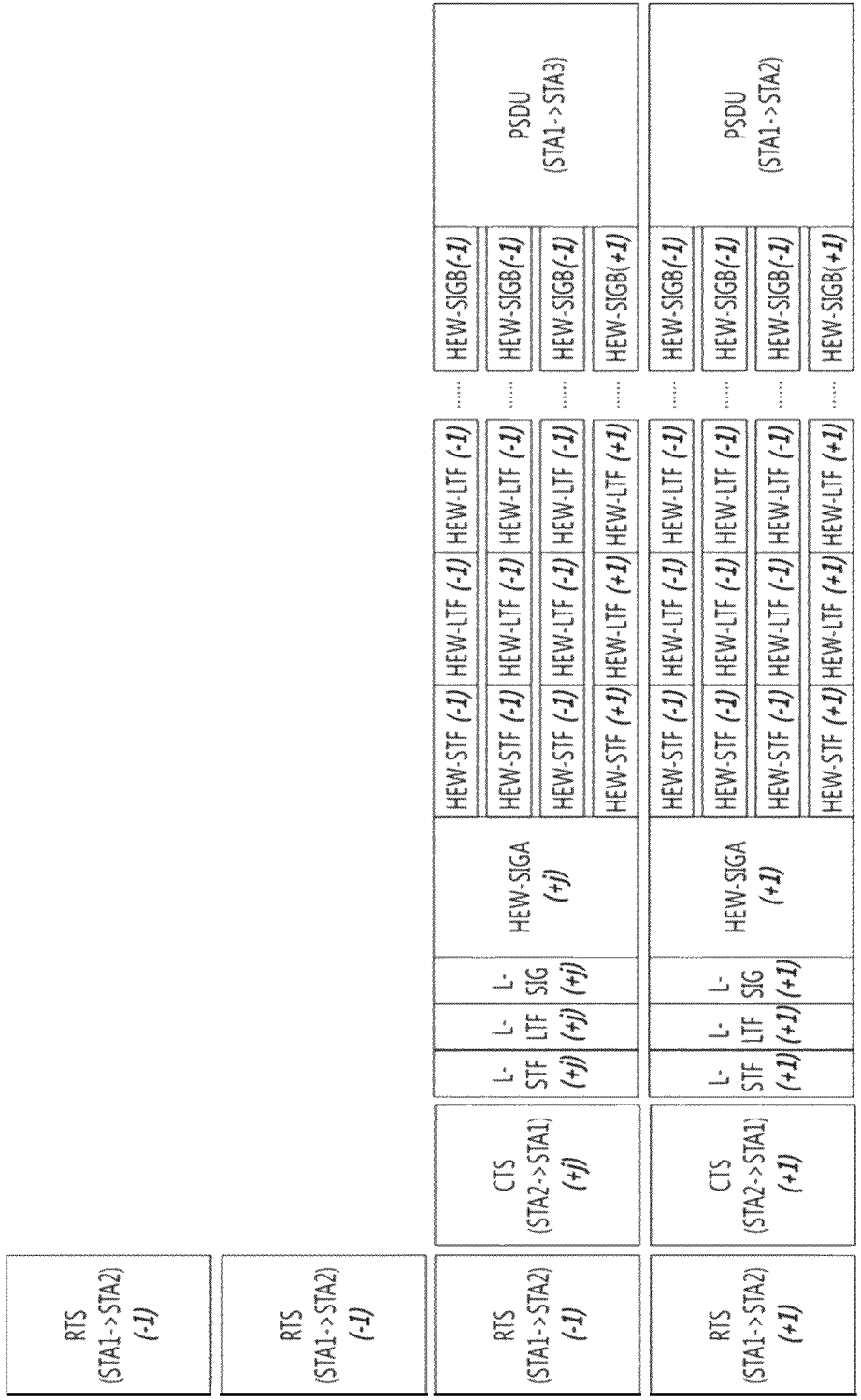
FIG. 9 shows bandwidth signaling according to an embodiment of the present invention.

FIG. 9 shows bandwidth signaling according to an embodiment of the present invention. An STA1 is a transmitter STA, and an STA2 is a destination STA.

Before transmitting an HEW PPDU, the STA1 transmits an RTS frame to the STA2, and receives a CTS frame from the STA2. The STA1 performs CCA, and since it is determined that an 80 MHz channel is idle, transmits the RTS frame through the 80 MHz channel in unit of 20 MHz channel in a duplicated manner. That is, four 20 MHz RTS frames (i.e., one 20 MHz RTS frame and three duplicated RTS frames) are transmitted at an 80 MHz band. For the purpose of decreasing a PAPR of an STA for transmitting the RTS frame, a value of {1, −1, −1, −1} may be multiplied each 20 MHz channel.

In the STA2, only a 40 MHz channel is idle and thus the RTS frame is received only through the 40 MHz channel. The STA2 responds with the CTS frame to the STA1 in the 40 MHz channel.

Although the STA1 transmits the RTS frame through the 80 MHz channel, the CTS frame is received only through the 40 MHz channel. Therefore, a transmission bandwidth of an HEW PPDU transmitted at a later time may be set to a 40 MHz channel bandwidth at which a response is received using the CTS frame.

The CTS frame may also be transmitted in a duplicated manner in unit of 20 MHz. For the purpose of decreasing a PAPR of the STA2 for transmitting a plurality of CTS frames, a value of {1, j} may be multiplied each 20 MHz channel.

The HEW PPDU can be transmitted simultaneously to a plurality of destination STAs by a transmitter STA by independently dividing a channel. In FIG. 9, as to a PSDU transmitted by the STA1, one PSDU is transmitted to the STA2 by using the lowermost 20 MHz channel, and at the same time, another PSDU is transmitted to an STA3 by using a 20 MHz channel thereon. However, optionally, it is also possible that the transmitter STA, i.e., STA1, performs transmission to only one destination STA without having to independently divide all available channels.

When the HEW PPDU is simultaneously transmitted to a plurality of destination STAs by independently dividing a channel, a channel bandwidth of each PSDU addressed to each destination STA may be limited to be less than or equal to a channel bandwidth in which a response is received using the CTS frame. Also, a sum of channel bandwidths of all PSDUs in the HEW PPDU may be limited to be less than or equal to a channel bandwidth in which a response is received using the CTS frame. After exchanging RTS/CTS frame, the HEW PPDU being simultaneously transmitted to a plurality of destination STAs may have a PSDU addressed to a STA responding a CTS frame. In FIG. 9, because the STA2 responds with the CTS frame, the PSDU addressed to the STA2 is included in the HEW PPDU.

A phase rotation sequence of a HEW PPDU may be determined based on a transmission bandwidth of the HEW PPDU. A phase rotation sequence of a HEW PPDU transmitted to either a single destination STA or transmitted to a plurality of destination STAs is same when the transmission bandwidth of the HEW PPDU is identical. In FIG. 9, an HEW PPDU using 512 FFT in a 40 MHz channel is applying the same phase rotation sequence as described in FIG. 6 although the PSDUs of HEW PPDU are addressed to a plurality of destination STAs.

When the HEW PPDU is transmitted at the 2.4 GHz band, RTS/CTS needs to be transmitted through a non-OFDM frame for compatibility with the legacy STA supporting IEEE 802.11b/g.

Figure 10:
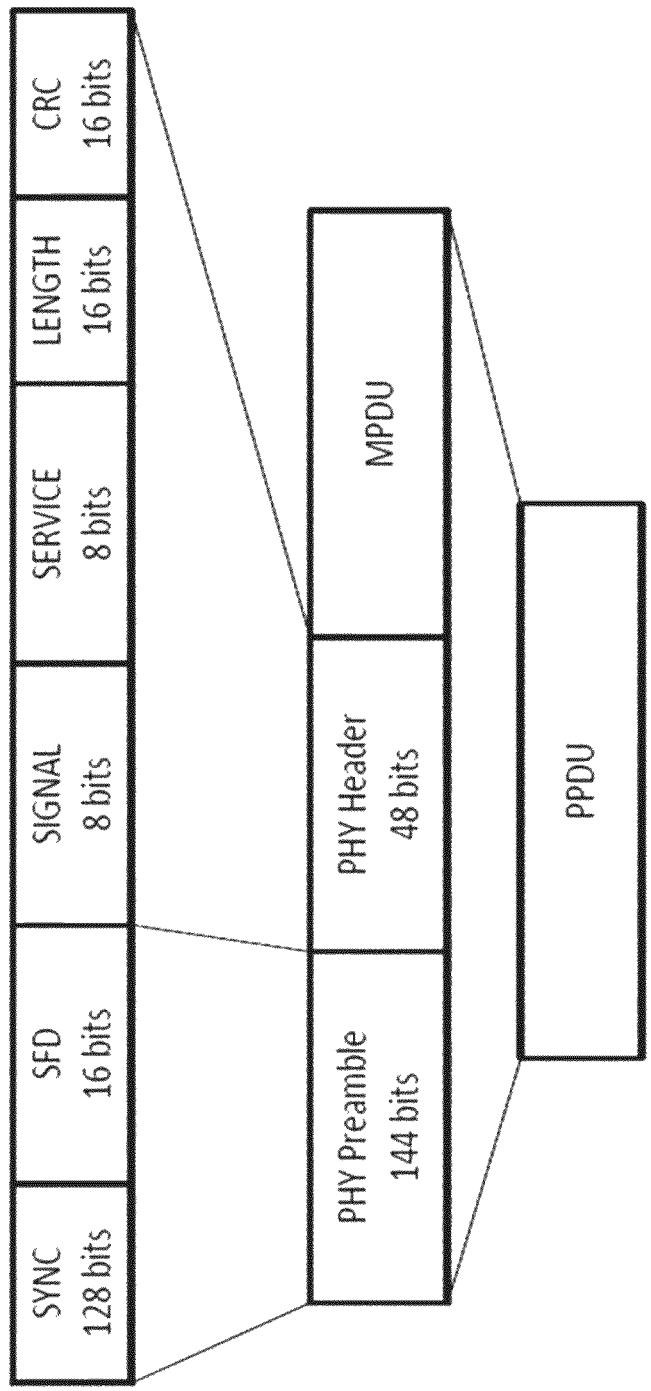
FIG. 10 shows a Direct Sequence Spread Spectrum (DSSS) PPDU format used in IEEE 802.11b/g.

FIG. 10 shows a Direct Sequence Spread Spectrum (DSSS) PPDU format used in IEEE 802.11b/g.

If an RTS/CTS frame is transmitted with the DSSS PPDU format, a channel bandwidth at which the RTS/CTS frame is transmitted is encoded in an 8-bit SERVICE field as follows.

TABLE 2

| B0 | B1 | B2 | B3 | B4 | B5 | B6 | B7 |
|---|---|---|---|---|---|---|---|
| Reserved | Reserved | Locked clocks bit. 0 = not, 1 = locked | | CH_BAND-WIDTH_IN_NON_HT | | DYN_BAND-WIDTH_IN_NON_HT | Length extension bit |

A value CH_BANDWIDTH_IN_NON_HT is included in B4-B5 of the SERVICE field, and is encoded as follows.

TABLE 3

| CH_BANDWIDTH_IN_NON_HT | Value |
|---|---|
| CBW5 | 0 |
| CBW20 | 1 |
| CBW40 | 2 |
| CBW80 | 3 |

When the transmitter STA transmits an RTS frame, CH_BANDWIDTH_IN_NON_HT is encoded in such a manner that the full channel bandwidth which is used to transmit the RTS frame since it is determined to be currently idle has a value of 5 MHz, 20 MHz, 40 MHz, and 80 MHz. When the destination STA responds with a CTS frame, CH_BANDWIDTH_IN_NON_HT is encoded in such a manner that the full channel bandwidth which is used to transmit the CTS frame since it is determined to be currently idle has a value of 5 MHz, 20 MHz, 40 MHz, and 80 MHz.

A flag value 'DYN_BANDWIDTH_IN_NON_HT' is included in B6 of the SERVICE field, and indicates whether a dynamic channel bandwidth signal is used through RTS/CTS. If the dynamic channel bandwidth signal is used, it implies that a DATA frame of an HEW PPDU can be transmitted with a channel bandwidth less than the full channel bandwidth of an RTS first transmitted by the transmitter STA. Therefore, when the destination STA responds with the CTS frame, it is possible to respond with the CTS even if a channel bandwidth determined to be currently idle is less than the full channel bandwidth of the RTS. However, if the dynamic channel bandwidth signal is not used, it implies that the DATA frame of the HEW PPDU cannot be transmitted with a channel bandwidth less than the full channel bandwidth of the RTS first transmitted by the transmitter STA. Therefore, it implies that, when the destination STA responds with the CTS frame, it is not allowed to respond with the CTS frame if the channel bandwidth determined to be currently idle is less than the full channel bandwidth of the RTS.

Meanwhile, control frames (e.g., RTS frame, CTS frame, ACK frame, Block ACK frame, CF-END frame) include a duration field which plays a role of protecting frames to be transmitted subsequently. For example, the duration field may indicate a remaining Transmission Opportunity (TXOP) duration or may indicate an estimated time required for the transmission of the following frame. If a receiving STA is not a destination STA of the received frame, the receiving STA can set a Network Allocation Vector (NAV) during the time indicated by the duration field. When the NAV is set, the STA considers the channel is busy and does not access the channel.

In general, control frames (e.g., RTS frame, CTS frame, ACK frame, Block ACK frame, CF-END frame) are transmitted with a legacy PPDU format so that the control frames can be received by all STAs. However, if the control frames are transmitted through an HEW PPDU, a GROUP ID field and PARTIAL AID field of an HEW SIGA are respectively set to 63 and 0 in the HEW PPDU. In case of frames other than the control frames, the GROUP ID and PARTIAL AID field are configured as shown in the following table:

TABLE 4

| Condition | Group ID | Partial AID |
|---|---|---|
| Addressed to AP | 0 | BSSID[39:47] |
| Sent by an AP and addressed to a STA associated with that AP | 63 | (dec(AID[0:8]) + dec(BSSID[44:47] XOR BSSID[40:43]) × $2^5$) mod $2^9$ | where XOR is a bitwise exclusive OR operation, mod X indicates the X-modulo operation, dec(A[b:c]) is the cast to decimal operator where b is scaled by $2^0$ and c by $2^{c-b}$.

A basic service set (BSS) may include a set of STAs that have successfully synchronized with an AP. A basic service set identifier (BSSID) is a 48 bits identifier of a corresponding BSS.

The reason of setting the GROUP ID field and PARTIAL AID field of the HEW SIGA respectively to 63 and 0 with respect to the control frames is to allow STAs other than a destination STA to receive a corresponding control frame and to correctly configure an NAV through a duration field.

In the control frame (e.g., RTS frame, CTS frame, ACK frame, Block ACK frame,

CF-END frame, etc.) transmitted to an AP, the GROUP ID and PARTIAL AID of the HEW SIGA are respectively set to 63 and 0 other than 0 and BSSID[39:47]. This means that, even if the GROUP ID and PARTIAL AID values of the frame received by the AP are respectively set to 63 and 0 other than 0 and BSSID[39:47], the AP must process the frame instead of filtering the frame out. In the control frame (e.g., RTS frame, CTS frame, ACK frame, Block ACK frame, CF-END frame, etc.) transmitted to the AP, the GROUP ID and PARTIAL AID field of the HEW SIGA are respectively set to 63 and 0 other than 0 and BSSID[39:47]. This also means that, even if a GROUP_ID and PARTIAL_AID field value of a frame received by an STA are respectively to 63 and 0 other than 63 and (dec(AID[0:8])+ dec(BSSID[44:47] XOR BSSID[40:43])×$2^5$) mod $2^9$, the STA must process the frame instead of filtering the frame out.

A COLOR value is used for identifying the BSS, and the number of bits thereof is less than that of a BSSID. For example, the BSSID may be 48 bits, whereas the COLOR value may be 3 bits. The BSSID has the same format as a MAC address, whereas the COLOR value is any value reported in advance by the AP to the STA.

A COLOR field indicating the COLOR value may be included in an HEW-SIGA. In order to report whether the COLOR field is present, the HEW-SIGA may further include a COLOR indication field. For example, if the COLOR indication field is set to 0, it indicates that the COLOR field is present in the HEW-SIGA. If the COLOR indication field is set to 1, it indicates that the COLOR field is not present in the HEW-SIGA.

If the COLOR field is included as an identifier for identifying a BSS in the HEW SIGA, the COLOR field may be set to a specific value such as 0.

If a received frame has the COLOR field which is set to a specific value such as 0, this implies that the received frame needs not to be filtered out but to be processed.

As described above, in the HEW PPDU format, the transmitter STA can perform simultaneous transmission to the plurality of destination STAs by independently dividing the channel. In addition, for the purpose of bandwidth signaling through an RTS/CTS frame, the RTS/CTS frame may be transmitted as a PPDU format in each subchannel.

Figure 11:
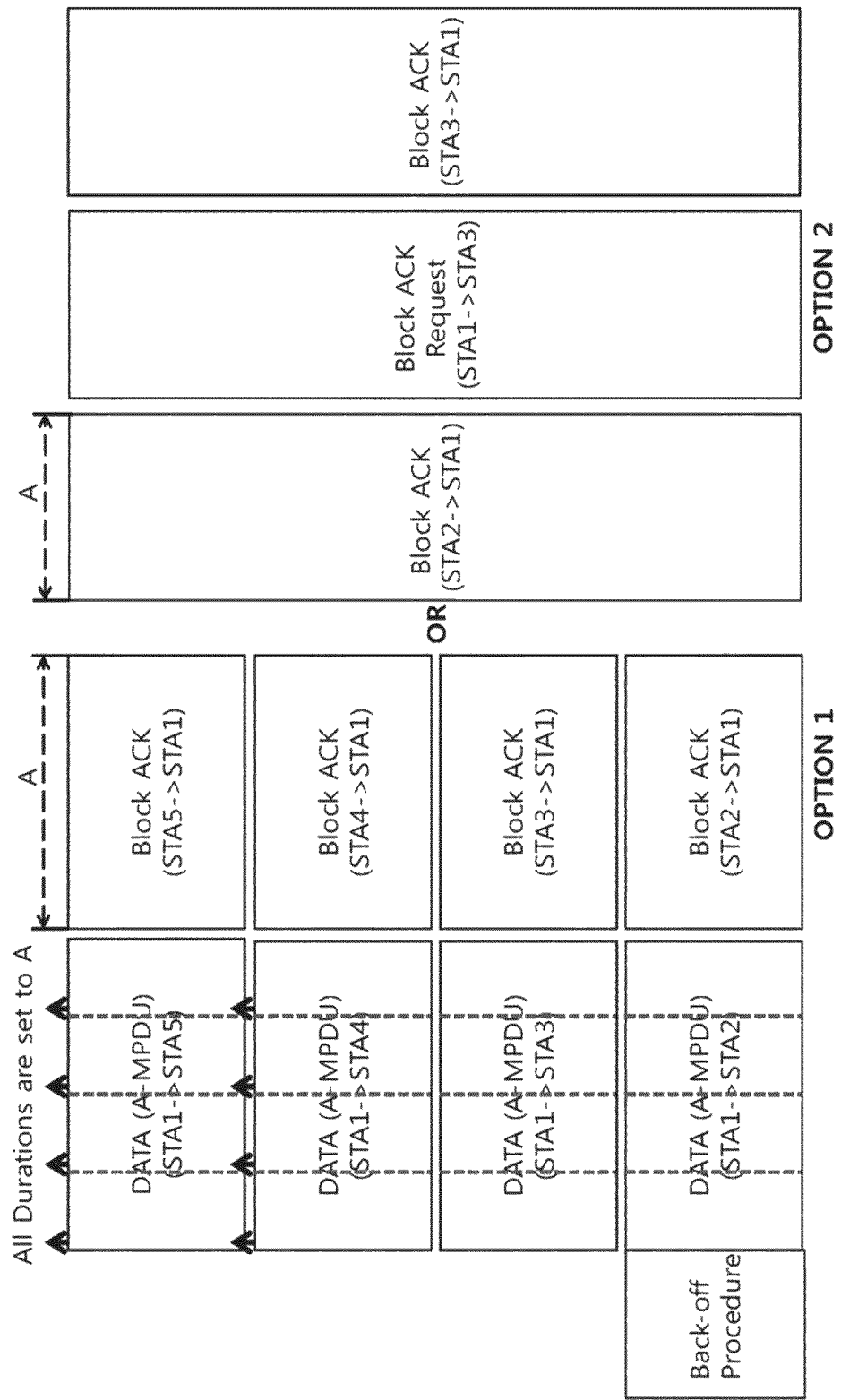
FIG. 11 shows data transmission according to an embodiment of the present invention.

FIG. 11 shows data transmission according to an embodiment of the present invention.

This is a case where a transmitter STA transmits a PPDU to a plurality of destination STAs by independently dividing a channel. The transmitter STA STA1 can perform simultaneously transmission to the plurality of destination STAs by independently dividing the channel. This is a downlink OFDMA case if the STA1 is regarded as an AP.

The STA1 performs a back-off procedure in a primary channel (a channel shown in a lowermost portion in FIG. 11), and thereafter transmits a PPDU. The transmitter STA needs to perform transmission to the plurality of destination STAs, i.e., the STAs 2, 3, 4, and 5, during same transmission time. The PPDU may include a plurality of PSDUs for the plurality of destination STAs. In order to make PSDUs have same transmission time, the PPDU is generated as an aggregated medium access control (MAC) protocol data unit (A-MPDU). A Null A-MPDU having a length of 0 is attached to adjust the transmission time to be equal to each other.

After the plurality of destination STAs receive the PPDU, each destination STA transmits a response frame (e.g., block ACK) to the STA1. The response frame transmitted by each destination STA to the STA1 must also be transmitted with same transmission time.

There may be two options to transmit the response frame. In a first option, the plurality of destination STAs simultaneously transmit the response frame to the transmitter STA by an independently divided channel. In a second option, each destination STA transmits the response frame sequentially to the transmitter STA by using a full channel bandwidth. In order to support the sequential response frame transmission for each destination STA, the transmitter STA transmits a response request frame such as a block ACK request.

When the destination STA transmits the response frame to the STA1, a transmission bandwidth of the response frame may be less than a transmission bandwidth of the PPDU transmitted by the STA1. A transmission bandwidth for subsequent PPDU transmission of the transmitter STA may be less than or equal to the transmission bandwidth of the response frame of the destination STA.

As shown in FIG. 11, duration fields of MPDUs in an A-MPDU may be set to same values. Comparing A-MPDUs to be transmitted to STA4 and STA5, duration fields of MPDUs constituting an A-MPDU for the STA4 are set to 'A'. In addition, duration fields of MPDUs constituting an A-MPDU for the STA5 are also set to 'A'. That is, in a case where the transmitter STA performs simultaneous transmission to the plurality of destination STAs by independently dividing a channel, the duration fields of the MPDUs have the same values in two aspects, i.e., in PPDUs to be transmitted to different destination STAs and in PPDUs to be transmitted to one destination STA. Also those two aspects can be interpreted as follows: in PPDUs to be transmitted on different channels and in PPDUs to be transmitted on same channel.

If a STA receives PPDUs transmitted in different channels and the PPDUs have the same TA field in a MAC header, this is a case where the transmitter STA performs simultaneous transmission to the plurality of destination STAs by independently dividing the channel. If an error occurs in a PPDU in a certain channel, a duration field of the erroneous PPDU cannot be known. The STA may obtain a duration field of the erroneous PPDU from a duration field of another PPDU currently received in a different channel. Therefore, in this case, this means that a DCF Interframe Space (DIFS) can be used without having to use an Extended Inter-Frame Space (EIFS) when a corresponding STA performs a channel access procedure.

In a case where an error occurs in a frame received during a channel access procedure of an STA and thus a duration field cannot be read, the EIFS is a value used for channel access deferring by providing an inter-frame space as a value greater than or equal to a transmission time of an ACK control frame for the purpose of protecting an ACK control frame which can be transmitted at a later time. On the other hand, the DIFS implies a minimum inter-frame space provided in a channel access procedure in normal data frame transmission.

Figure 12:
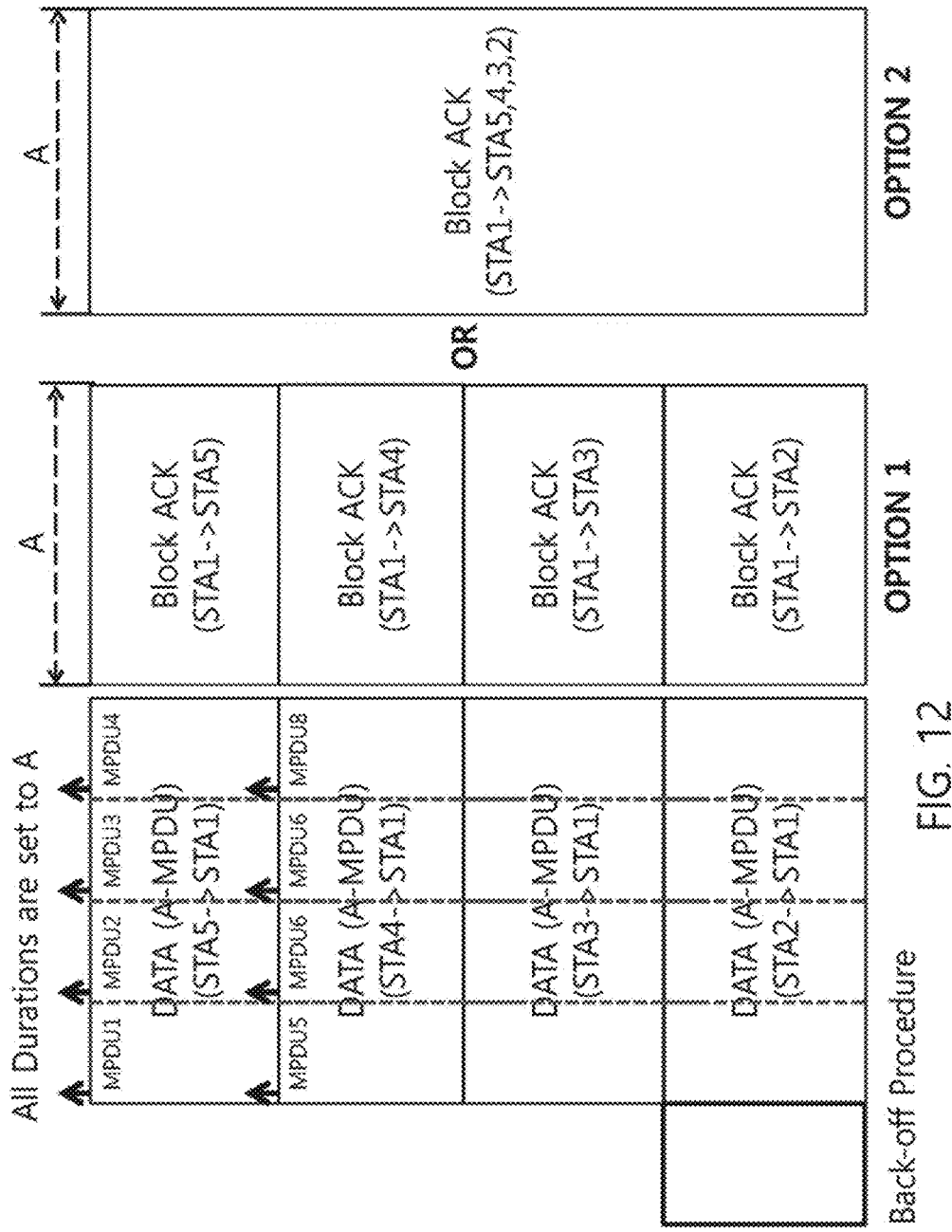
FIG. 12 shows data transmission according to another embodiment of the present invention.

FIG. 12 shows data transmission according to another embodiment of the present invention.

A plurality of transmitter STAs perform simultaneous transmission to one destination STA by independently dividing a channel, which is identical to an uplink OFDMA case if an STA1 is regarded as an AP.

An STA2 performs a back-off procedure in a primary channel (a channel shown in a lowermost portion in FIG. 12), and thereafter transmits a PPDU. In this case, the transmitter STAs correspond to STAs 3, 4, and 5, and perform simultaneous transmission by independently dividing each channel. The plurality of transmitter STAs must perform simultaneous transmission to one designation STA, i.e., the STA1, during same transmission time. STA2, 3, 4 and 5 may transmit a plurality of PPDUs to one destination STA. In order to make PPDUs have same transmission time, respective PPDU is generated as an A-MPDU. A Null A-MPDU having a length of 0 is attached to adjust the transmission time to be equal to each other.

After one destination STA receives the PPDUs, the destination STA transmits a response frame (e.g., block ACK) to each transmitter STA. The response frames are transmitted by the destination STA to each transmitter STA with a same transmission time.

There may be two options to transmit the response frames. In a first option, the destination STA simultaneously transmits the response frames to the plurality of transmitter STAs by independently dividing the channel. In a second option, the destination STA configures one block ACK frame for the plurality of transmitter STAs and transmits the frame in a broadcast manner by using a full channel bandwidth.

When the destination STA transmits the response frame to the transmitter STAs, a transmission bandwidth of the response frame may be less than or equal to a sum of transmission bandwidths of the PPDUs transmitted by the transmitter STAs. A transmission bandwidth for subsequent PPDU transmission of the transmitter STAs may be less than or equal to the transmission bandwidth of the response frame.

As shown in FIG. 12, the duration fields of MPDUs transmitted by transmitter STAs may be set to the same values. Comparing A-MPDUs transmitted by STAs 4 and 5, duration fields of MPDUs constituting an A-MPDU transmitted by the STA4 are set to 'A'. In addition, duration fields of MPDUs constituting an A-MPDU transmitted by the STA5 are also set to 'A'. That is, in a case where the plurality of transmitter STAs perform simultaneous transmission to one destination STA by independently dividing a channel, the duration fields of the MPDUs have the same value in two aspects, i.e., in PPDUs transmitted by different transmitter STAs and in PPDUs transmitted by one transmitter STA. Also those two aspects can be interpreted as follow: in PPDUs transmitted on different channels and in PPDUs transmitted on same channel.

If a STA receives PPDUs transmitted in different channels and the PPDUs have the same RA field in a MAC header or the same partial AID in a PLCP header, this is a case where the plurality of transmitter STAs perform simultaneous transmission to one destination STA by independently dividing the channel. If an error occurs in a PPDU in a certain channel, a duration field of the erroneous PPDU cannot be known. The STA may obtain a duration field value of the erroneous PPDU from a duration field of another PPDU currently received in a different channel. Therefore, in this case, this means that a DIFS can be used without having to use an EIFS when a corresponding STA performs a channel access procedure.

Figure 13:
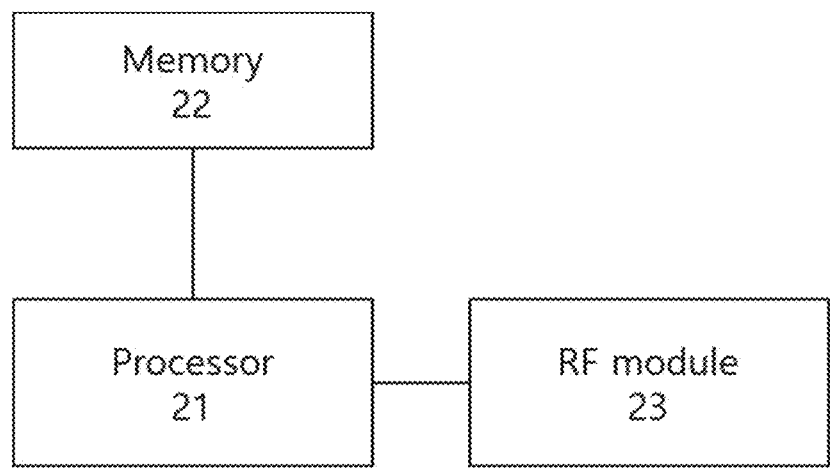
FIG. 13 is a block diagram of an STA according to an embodiment of the present invention.

FIG. 13 is a block diagram of an STA according to an embodiment of the present invention.

The STA may include a processor 21, a memory 22, and a Radio Frequency (RF) module 23.

The processor 21 implements an operation of the STA according to the embodiment of the present invention. The processor 21 may generate a PPDU according to an embodiment of the present invention and may instruct the RF module 23 to transmit the PPDU. The memory 22 stores instructions for the operation of the processor 21. The stored instructions may be executed by the processor 21 and may be implemented to perform the aforementioned operation of the STA. The RF module 23 transmits and receives a radio signal.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method for communicating in a wireless local area network, the method comprising:
   receiving, at a receiving station, a multi-user physical layer protocol data unit (MU-PPDU) over an operating bandwidth, the MU-PPDU including a First Signal field, a Second Signal field, and a data portion;
   wherein the First Signal field comprises bandwidth information, the bandwidth information indicating the operating bandwidth over which the MU-PPDU was received;
   wherein the data portion comprises at least one aggregated-medium access control (MAC) protocol data units (A-MPDU);
   wherein the Second Signal field comprising information identifying a first sub-channel carrying the at least one A-MPDU for the receiving station;
   wherein
      the First Signal field is phase-rotated over at least one first subcarrier group, each first subcarrier group having bandwidth of 20 MHz within the operating bandwidth, and
      the Second Signal field is phase rotated over a plurality of second subcarrier groups, each second subcarrier group having bandwidth that is less than 20 MHz within the operating bandwidth;
   determining a type of block acknowledgement requested, the block acknowledgement indicating a successful receipt of the at least one A-MPDU by the receiving station;
   transmitting, when a first type of acknowledgement is requested, a block acknowledgement over a second sub-channel, the second sub-channel assigned to the receiving station; and
   transmitting, when a second type of acknowledgement is requested, a block acknowledgement over the operating bandwidth.

2. The method of claim 1 wherein each A-MPDU of the MU-PPDU is associated with one sub-channel of a plurality of sub-channels within the operating bandwidth and has at least one duration field, and all duration fields in all A-MPDUs associated with the plurality of sub-channels are set to a same value.

3. The method of claim 1 wherein the First Signal field is associated with a first fast Fourier transform (FFT) size and the data portion is associated with a second FFT size; and
   wherein the second FFT size is four times the first FFT size.

4. The method of claim 3
   wherein the first FFT size is 64 and the second FFT size is 256 when the operating bandwidth is 20 MHz;
   wherein the first FFT size is 128 and the second FFT size is 512 when the operating bandwidth is 40 MHz;
   wherein the first FFT size is 256 and the second FFT size is 1024 when the operating bandwidth is 80 MHz; and
   wherein the first FFT size is 512 and the second FFT size is 2048 when the operating bandwidth is 160 MHz.

5. The method of claim 1 wherein the First Signal field comprises space-time block code (STBC) information, the STBC information having one bit and indicating whether the STBC is applied to the data portion.

6. A device for communicating in a wireless local area network, the device comprising:
   a radio frequency module configured to transmit and receive radio signals;
   a processor operatively coupled with the radio frequency module; and
   memory disposed to said processor, said memory including instructions, when executed by said processor causes the processor to:
      process a multi-user physical layer protocol data unit (MU-PPDU) over an operating bandwidth, the MU-PPDU including a First Signal field, a Second Signal field, and a data portion;
      wherein the First Signal field comprises bandwidth information, the bandwidth information indicating the operating bandwidth over which the MU-PPDU was received;
      wherein the data portion comprises at least one aggregated-medium access control (MAC) protocol data units (A-MPDU);
      wherein the Second Signal field comprising information identifying a first sub-channel carrying the at least one A-MPDU for the receiving station;
      wherein
         the First Signal field is phase-rotated over at least one first subcarrier group, each first subcarrier group having bandwidth of 20 MHz within the operating bandwidth, and
         the Second Signal field is phase rotated over a plurality of second subcarrier groups, each second subcarrier group having bandwidth that is less than 20 MHz within the operating bandwidth;
      determine a type of block acknowledgement requested, the block acknowledgement indicating a successful receipt of the at least one A-MPDU by the device;
      cause the radio frequency module to transmit, when a first type of acknowledgement is requested, a block acknowledgement over a second sub-channel, the second sub-channel assigned to the device; and
      cause the radio frequency module to transmit, when a second type of acknowledgement is requested, a block acknowledgement over the operating bandwidth.

7. The device of claim 6 wherein each A-MPDU of the MU-PPDU is associated with one sub-channel of a plurality of sub-channels within the operating bandwidth and has at least one duration field, and all duration fields in all A-MPDUs associated with the plurality of sub-channels are set to a same value.

8. The device of claim 6 wherein the First Signal field is associated with a first fast Fourier transform (FFT) size and the data portion is associated with a second FFT size; and
   wherein the second FFT size is four times the first FFT size.

9. The device of claim 8
   wherein the first FFT size is 64 and the second FFT size is 256 when the operating bandwidth is 20 MHz;

wherein the first FFT size is 128 and the second FFT size is 512 when the operating bandwidth is 40 MHz;

wherein the first FFT size is 256 and the second FFT size is 1024 when the operating bandwidth is 80 MHz; and wherein the first FFT size is 512 and the second FFT size is 2048 when the operating bandwidth is 160 MHz.

10. The device of claim 6 wherein the First Signal field comprises space-time block code (STBC) information, the STBC information having one bit and indicating whether the STBC is applied to the data portion.

* * * * *